(No Model.)
J. ADAIR.
INKSTAND.
No. 453,687. Patented June 9, 1891.
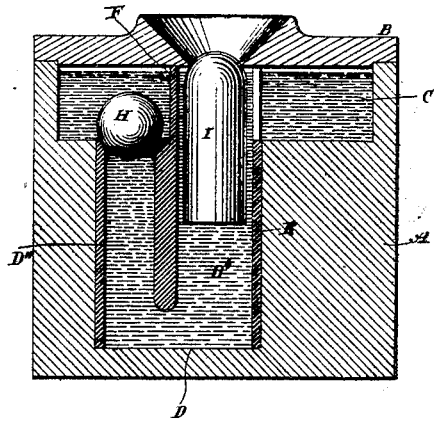
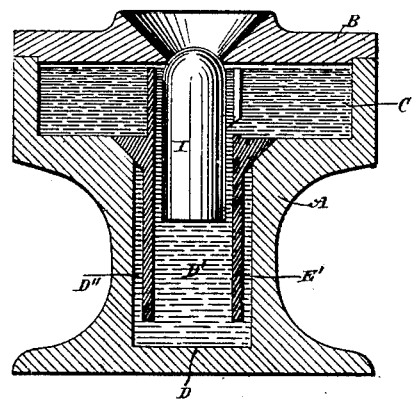
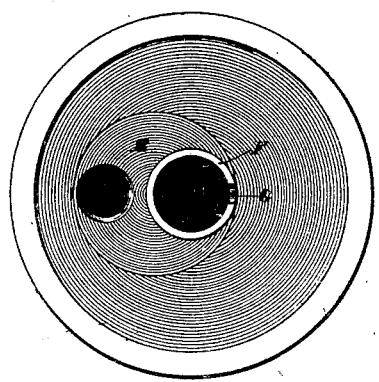
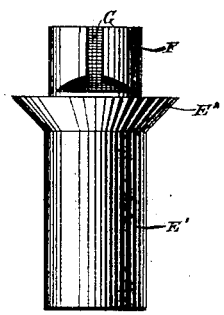
Witnesses:
Raphael Netter
Frank D. Murphy
Inventor
James Adair
by
Duncan & Page.
Attorneys

UNITED STATES PATENT OFFICE.

JAMES ADAIR, OF NEW YORK, N. Y.

INKSTAND.

SPECIFICATION forming part of Letters Patent No. 453,687, dated June 9, 1891.

Application filed January 7, 1891. Serial No. 376,980. (No model.)

*To all whom it may concern:*

Be it known that I, JAMES ADAIR, a citizen of the United States, residing at New York, in the county and State of New York, have invented certain new and useful Improvements in Inkstands, of which the following is a specification, reference being had to the drawings accompanying and forming a part of the same.

This invention is an improvement in self-closing inkstands, the object of the same being to provide a device of this kind more simple in its construction and of more certain and efficient action than those which have heretofore been devised.

So far as my information of the prior state of the art enables me to judge, the invention which I have made involves the following useful and novel features: First, I employ an inkstand provided with a cover containing a small opening for the insertion of the pen, which, while the reservoir contains ink, is closed by a float or buoyant body sustained by the ink, the said float being preferably elongated or of cylindrical shape and with a rounded top. This float is contained in a well which forms part of and is below the chamber or reservoir for the ink, and a passage is provided between the lower part of the well or that below the float and the upper reservoir, so that when the float is depressed by the insertion of the pen the displaced ink finds ready access into the reservoir. Second, this passage is provided with a valve which permits the ink to flow readily into the reservoir from the well, but which retards the return flow, so that while the float is very easily and quickly depressed it rises more slowly and does not touch the point of the pen after its withdrawal from the ink. These results are secured to better advantage by means of certain improved details of construction which I have devised, and which are more specifically indicated in the accompanying description and appended claims.

In the accompanying drawings, Figure 1 is a vertical central section of an inkstand embodying my improvements. Fig. 2 is a top plan view of the same with the cover removed. Fig. 3 is a vertical central section of the preferred form of the invention, and Fig. 4 is a side elevation of a part of the same detached.

The shape and dimensions of the body of the device may be very much varied. In Fig. 1 is shown a plain cylindrical body A, provided with a cover B, the latter being formed with a small opening for the insertion of the pen. Immediately below the cover or in the upper part of the body of the inkstand is a space or chamber C, which constitutes the ink-reservoir proper. Below this is a well D, which is of smaller diameter. For convenience in manufacture, though this is not essential, I use in the form of inkstand shown in Fig. 1 a separate piece E, which is fitted down into the space D. This piece E is hollowed out to form the well proper D', and the edges of the opening are extended up in the raised rim or flange F, that reaches up to or nearly up to the cover B. One or more slots or perforations G are formed in this extension, so that there is a free passage for the flow of ink between the well and the reservoir. From the lower part of the well D' is a channel or passage D'', that opens into the upper chamber or reservoir, and some form of valve, as a ball H, is provided therefor which will permit a ready flow of ink from the well to the reservoir. Within the well D' is a float or buoyant body I, that is held up normally by its buoyancy and closes the opening in the cover B. This float is or may be an inverted bell-jar of glass, or it may be made of any other suitable material, such as wood or cork protected by a water-proof coating, and any hard resisting-surface on top to prevent injury from the pen-point. In any case it should be somewhat elongated, so as to allow for a considerable fall in the level of ink.

The operation of this device is readily perceived. A pen dipped in the usual way into the inkstand encounters the top of the float; but the latter is depressed with scarcely any perceptible resistance, permitting the point of the pen to enter the ink-well. As the float is depressed, ink flows into the well above it through the slots or perforations in the flange F. At the same time the ink in the bottom of the well is displaced and flows up into the reservoir through the passage D″. There should be but very little space between the float and the sides of the well in which it is contained, as thereby a slower return is secured and the float held in position to properly close the opening in the cover when it rises. As soon as the pressure of the pen is removed from the top of the float the latter rises. If the valve or ball H be dispensed with, the ink flows freely back into the well through the passage D″, causing the float to rise with some degree of rapidity, so that an improved result is secured by employing a valve which offers an obstruction to the return of the ink. Thus after the depression and release of the float the ink that flows back to replace that forced out of the well has to leak through the valve or find its way through the space between the float and the sides of the well. Consequently the return of the float is slow. The raised rim or flange F serves as a guide for the float and also prevents the ink from being dipped off obliquely into the reservoir.

The preferred form of my improved inkstand is shown in Fig. 3. In this form the part corresponding to the separate piece E that enters the well is made to serve as the valve. It is made in this case of hard rubber or any material of specific gravity somewhat greater than that of the ink. The upper and lower parts of the reservoir are substantially the same as in Fig. 1. E′ is a cylinder, of glass, hard rubber, or other suitable material, which is made of somewhat smaller diameter than the well D, so that when inserted it leaves an annular space which corresponds to the passage D″. Around the cylinder E′ is a flange E″, the under side of which is beveled and rests on the correspondingly-beveled edge of the well. The top of the cylinder extends up to within a short distance of the cover B to allow sufficient vertical play, and its lower edge is raised somewhat above the bottom of the well. As in the form previously described, the upper part contains a slot G, as shown more plainly in Fig. 4. The float I is the same as in Fig. 1. When this float is depressed by the pen-point, the ink is forced from the inner well D′ upward through the annular space D″ and into the reservoir, the entire part E′ being lifted by the pressure applied. When the float is released, the ink returns to the well D′ by leaking back through the valve-seat and by flowing downward between the sides or walls of well D′ and the float. When a valve is used, it is largely immaterial where it is placed, as will readily be perceived. It will also be understood that the specific construction of the inkstand as a whole may be very greatly varied and that it may be made in many ways and forms without departure from the invention.

What I claim is—

1. In an inkstand, the combination, with an ink-reservoir, a well, and a cover containing an opening over the well, of a float or buoyant body contained in the well and adapted to normally close the opening in the cover, and a valve-controlled passage for permitting the ready escape from the well of ink displaced by the depression of the float, as set forth.

2. In an inkstand, the combination, with an ink-reservoir and well below the same, and a cover over the reservoir containing an opening for the pen, of a float or buoyant body contained in the well and adapted to close the opening in the cover, and a passage or channel for the flow of ink from the lower part of the well to the reservoir when displaced by the depression of the float, as set forth.

3. In an inkstand, the combination, with an ink-reservoir in the upper portion and a cover provided with a pen-opening, of a vertical well under said opening, a float or buoyant body contained in said well and normally closing the opening, and a passage or channel extending from the bottom of said well up to the reservoir and a valve contained therein.

4. In an inkstand, the combination, with an ink-reservoir in the upper portion and a cover provided with a pen-opening, of a well under said opening provided with a flange or raised rim containing a slot or perforation, and a float or buoyant body contained in said well and normally closing the opening in the cover.

5. In an inkstand, the combination of a cover containing a pen-opening, a well under said opening, the walls of which extend up to the cover, a float contained in said well and normally closing the opening in the cover, an ink-reservoir below the cover, and passages of communication from the upper and lower parts of said well into the reservoir, as set forth.

6. In an inkstand, the combination, with a cover containing a pen-opening, an upper reservoir, and a well of smaller diameter beneath the opening in the cover and extending downward from the reservoir, of a cylinder fitting loosely within the well and having a flange or projection that rests upon the upper edge of the well, and a float or buoyant body within the cylinder and adapted to close the opening in the cover.

7. In an inkstand formed with an upper reservoir and a well of smaller diameter below the same, the combination of a cylinder of smaller diameter than the well and provided with a flange that rests upon the edge of the well and with a slot or perforation in its upper portion, a cover over the reservoir provided with a pen-hole, and a float within the cylinder adapted to close the opening in the cover, as set forth.

8. In an inkstand, the combination, with a cover provided with a pen-hole, of an ink-reservoir and well, a valve-controlled passage between the reservoir and the lower part of the well, and a cylindrical float with rounded top contained in said well and adapted to close the opening in the cover, as set forth.

9. In an inkstand, the combination of a reservoir and a cover containing an opening for the insertion of a pen, of an automatic or self-closing float or body adapted to be moved away from the opening by the pen, and means for retarding or impeding the movement of the same operative only on its return or movement toward the opening, as set forth.

JAMES ADAIR.

Witnesses:
FRANK B. MURPHY,
RAPHAËL NETTER.